United States Patent [19]

Rysti

[11] 4,360,303
[45] Nov. 23, 1982

[54] METHOD AND APPARATUS FOR LOCATING SPACER STRIPS BETWEEN LAYERS OF TIMBER PACKAGES

[76] Inventor: Alpo Rysti, Friisiläntie 36, 02240 Espoo 24, Finland

[21] Appl. No.: 131,443

[22] Filed: Mar. 18, 1980

[30] Foreign Application Priority Data

Mar. 20, 1979 [FI] Finland .................................. 790948

[51] Int. Cl.$^3$ ............................................ B65G 57/26
[52] U.S. Cl. ..................................... 414/42; 198/424; 198/680; 414/69; 414/77; 414/786
[58] Field of Search ........................ 414/42, 76, 77, 82, 414/84, 85, 786, 907, 69; 198/424, 680; 271/180

[56] References Cited

U.S. PATENT DOCUMENTS

| | | | |
|---|---|---|---|
| 3,132,858 | 5/1964 | Bernard | 414/69 |
| 3,204,502 | 9/1965 | Fuller et al. | 414/69 X |
| 3,399,768 | 9/1968 | Holmberg et al. | 414/77 X |
| 3,643,621 | 2/1972 | Newnes | 414/42 X |
| 4,027,873 | 6/1977 | Bishop | 271/180 X |
| 4,144,976 | 3/1979 | Rysti | 198/680 X |

FOREIGN PATENT DOCUMENTS

| | | | |
|---|---|---|---|
| 955970 | 10/1974 | Canada | 414/42 |
| 2254519 | 5/1974 | Fed. Rep. of Germany | 414/42 |

*Primary Examiner*—Leslie J. Paperner
*Attorney, Agent, or Firm*—Steinberg & Raskin

[57] ABSTRACT

Spacer strips are positioned between vertically adjacent layers of timber in timber packages by locating a plurality of spacer strips which are supported by distribution members over the topmost layer of a timber package whereupon a plurality of depressors which are operatively associated with a frame structure are moved downwardly from an upper position so that respective depressors engage respective spacer strips supported by the distribution members so as to conduct and guide the strips downwardly into position upon the topmost layer of the timber package while the distribution members which support the strips are at the same time withdrawn from their supporting positions. According to the invention, the depressors are arranged in a manner such that as the depressors move downwardly subsequent to engaging respective spacer strips, the frame structure with which the depressors are associated remains substantially stationary and, additionally, the downward motion of the depressors comprises a free fall preferably accomplished by providing a sliding fit of the depressors in the frame structure.

10 Claims, 9 Drawing Figures

METHOD AND APPARATUS FOR LOCATING SPACER STRIPS BETWEEN LAYERS OF TIMBER PACKAGES

BACKGROUND OF THE INVENTION

This invention relates generally to methods and apparatus whereby spacer strips are placed between layers or courses of timber in timber packages and, more particularly, to such methods and apparatus wherein the spacers are conveyed by means of distribution apparatus to a position over the topmost course of the timber package whereupon the spacers so positioned are engaged from above by depressors whereupon the distribution members which support the strips are withdrawn from their supporting positions so that the depressors can conduct and guide the spacer strips downwardly into position upon the topmost layer of the timber package, the depressors then being raised to their upper position whereupon the above steps are repeated.

The present invention further relates to an apparatus for carrying out the procedure of the invention wherein the spacer strips are located by means of a distribution conveyor having supporting hooks associated therewith spaced from each other by a distance determined by the spacing between adjacent spacer strips, the apparatus further comprising an arrangement whereby the spacer strips are conducted and guided onto the topmost layer of the timber package, such arrangement including a plurality of depressors whose location is determined by the spacing between the spacer strips and which are operatively associated with overhead frame structure which is vertically movable.

SUMMARY OF THE INVENTION

One object of the present invention is to provide new and improved methods and apparatus for placing spacer strips between layers of timber packages which are operatively superior to the conventional methods and apparatus known in the art.

In accordance with the present invention, this and other objects are attained by providing a method comprising the improvement wherein the depressors conduct and guide the spacer strips while the frame structure which carry the depressors remain substantially stationary and wherein the downward motion of the depressors during such conducting and guiding movement comprises a free fall movement. Such free fall movement can be accelerated such, for example, as by means of a spring force.

The apparatus of the present invention comprises the improvement wherein the depressors are operatively engaged with the frame structure so that the depressors move downwardly to conduct and guide the spacer strips onto the topmost layer of the timber package in a manner such that the downward motion of the depressors comprises a free fall movement. Thus, the depressors can be operatively engaged with the frame structure by means of a slide fit, a pivotal engagement, or the like.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
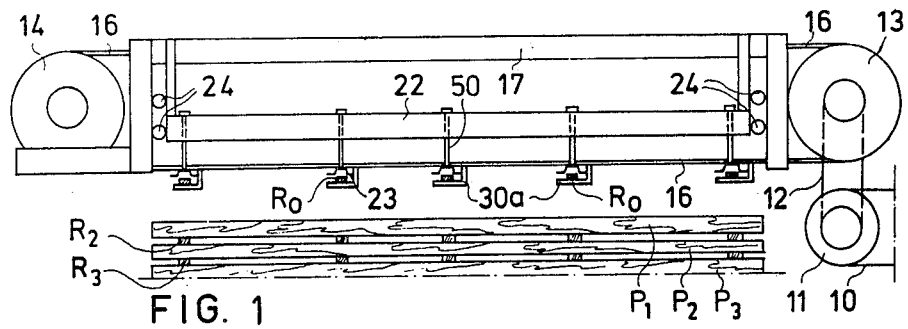
FIG. 1 is a schematic elevation view of an apparatus for performing the method of the present invention, the apparatus being shown with the depressors in their upper position.

All of the embodiments of the apparatus of the present invention illustrated in the figures are similar to the extent that each comprises supply conveyor apparatus comprising conveyor chains 10 guided by return rolls 11 and associated distributor conveyor apparatus comprising conveyor chains 16 guided between return rolls 13, 14. The distributor conveyor is driven by a motor (not shown) and a chain 12 interconnects the return rolls 13,11 of the distributor and supply conveyors so that the same motor which drives the distributor conveyor also drives the supply conveyor.

Figure 2:
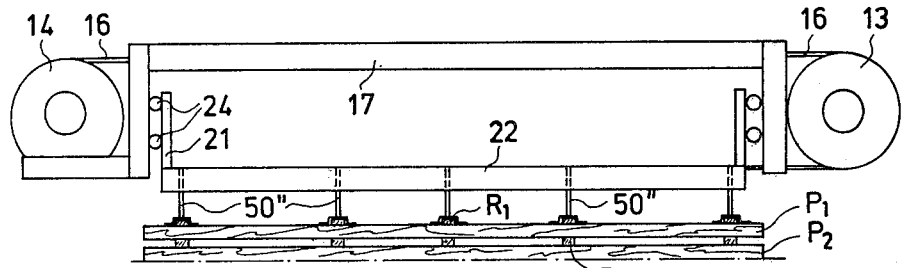
FIG. 2 is a view similar to FIG. 1 illustrating the depressors in their lower position whereby the spacer strips have been positioned on the topmost layer of the timber package.
Figure 6:
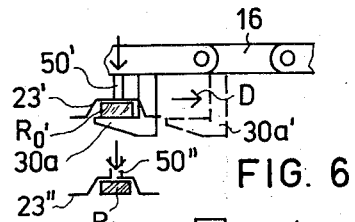
FIG. 6 is a partial view of the apparatus of the present invention illustrating two successive steps in the operation of the same.

In the embodiment of the invention illustrated in FIGS. 1 and 2, the distribution conveyor 16 has supporting hooks 30a fixed thereto spaced from each other by a distance determined by the desired spacing between adjacent spacing strips when the latter are positioned on respective layers of timber in the timber package. Such fixed hooks 30a are also illustrated in FIG. 6. In the embodiment of the invention illustrated in FIGS. 4A-4C, supporting hooks 30 are pivotally mounted to the distribution conveyor in a manner described in detail below.

Figure 5:
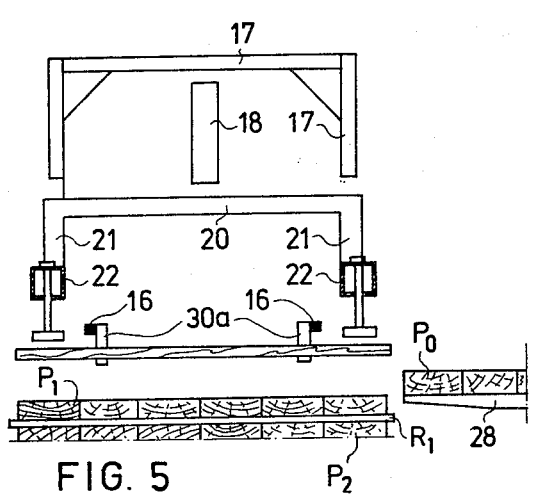
FIG. 5 is a front elevation view of the apparatus illustrated in FIG. 1.

As seen in FIGS. 1, 2 and 5, a frame structure 17 is located above the distributor conveyor apparatus 13, 14, 16. The frame structure 17 is formed of horizontally and vertically extending beams 20, 21, 22 and a hydraulic cylinder 18 is connected to a centrally extending horizontal beam (FIG. 5). The piston rod of the hydraulic cylinder 18 is connected to an upper, centrally extending horizontal beam of the frame 17, the latter being arranged to be vertically movable under the action of the hydraulic cylinder 18. The vertically movable frame has in its lower part horizontal beams 22 with which are associated the arms 50 of depressors or conductors as described in detail below.

Figures 3, 4A, 4B, 4C:
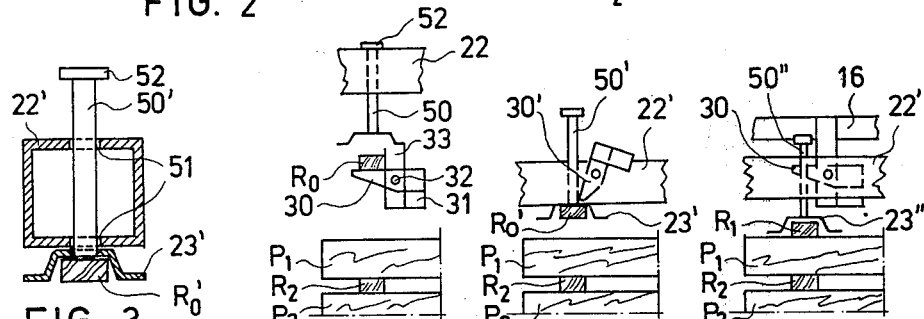
FIG. 3 is a detail view in section illustrating the operative engagement of a depressor and associated frame structure.
FIGS. 4A-C illustrate three successive steps during the operation of the apparatus illustrated in FIG. 1 according to the method of the present invention.
Figure 7:
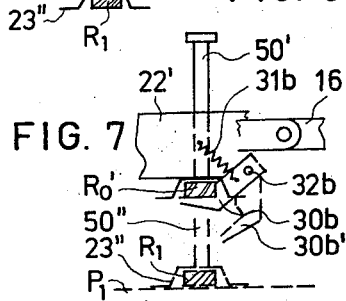
FIG. 7 is a view similar to FIG. 6 illustrating another embodiment of the present invention.

In the embodiment of the invention illustrated in FIGS. 4A-4C, conveyor chains 16 carry arms 33 to which turnable hooks 30 are pivotally attached by pivot pins 32. As seen in FIG. 7, turnable supporting hooks 306 are attached by the pivot pins 32b to the conveyor chains 16, and these hooks are provided with springs 31b which tend to urge the hooks 30b into their supporting position shown in solid lines.

The apparatus described above operates in the following manner. The supply conveyor 10, 11 dispenses the spacer strips $R_0$ onto the supporting hooks 30, 30a, 30b of the distributor conveyor apparatus in a manner known per se in the art. The distributor conveyor apparatus 13, 14, 16 transports the spacer strips into the position above the topmost layer $P_1$ of the timber package $P_1$, $P_2$, $P_3$ as determined by the desired spacing between adjacent spacer strips. As shown in FIGS. 1 and 2, the timber package contains between the layers $P_1$, $P_2$, $P_3$ the sets of spacer strips $R_2$, $R_3$.

The spacer strips $R_0$ supported on the hooks 30, 30a, 30b are deposited onto the topmost layer $P_1$ as follows. As seen in the figures, each depressor or conductor 23 has a top wall and a pair of side walls depending from the top wall so as to define a slot within the depressor. After the dropping pulse or command has been given, the frame structure 21, 22 descends and the depressors or conductors 23 are positioned upon and engage the strips $R_0$ with the spacer strips being located within the slots defined within the respective depressors, such as seen in FIG. 6.

According to a feature of the present invention, the depressor arms 50 are associated with the frame structure in a manner such that the depressors can fall freely, i.e., under the force of gravity. Thus, referring to FIG. 3, the depressor arms 50 freely pass through respective openings 51 formed in the beam 22 of frame 17. Accordingly, subsequent to the depressors 23 engaging the strips $R_0$ (FIG. 2), the frame structure continues to descend. However, owing to the sliding fit between the arms 50 and the horizontal beams 22 of the frame structure, the depressors 23 remain upon the spacer strips $R_0$ (FIGS. 3, 4B, 7), causing no appreciable pressure against them. As shown in FIG. 3, the free mobility of the horizontal beams 22' and the arms 50' is utilized here.

In the embodiment shown in FIGS. 1, 2 and 6, the chain is then actuated so that the hooks 30a move in the direction of arrow D into position 30a' (FIG. 6), whereby the set of spacer strips $R_0'$ is free to fall downwardly onto the layer $P_1$ under gravity forces. Owing to the sliding fit of the beams 22 and arms 50, the depressors 23, 50 follow the spacer strips under the action of gravity or, in other words, fall freely under the action of gravity. Direct or indirect contact between the top and/or side walls of the depressors 23 and the spacer strips is maintained throughout the fall until the spacer strips engage the topmost layer of the timber package, such as seen in FIGS. 2 and 6.

As seen in FIG. 6, the spacer strip $R_1$ falls down on the topmost layer $P_1$, and at the same time the arms 50 move from position 50' in FIG. 3 to position 50" in FIG. 6, while the horizontal beams 22" remain stationary. This results in the arms 50 freely falling downwardly in the openings 51 of the beams. In the next operational step, the horizontal beams 22' of the frame structure rise to their upper position, and at a certain stage of their ascent their upper sides engage flanges 52 on the upper ends of the arms 50. At this time the arms 50 rise together with the horizontal beams 22 into a ready position for receiving the next set of spacer strips.

The operation of the embodiment illustrated in FIGS. 4A–4C is now described, starting with the position illustrated in FIG. 4A. In this position the horizontal beams 22 of the frame structure are descending and at the same time the arms 50 with their depressors 23 engage the spacer strips $R_0$ which are supported by pivotally mounted hooks which are provided with counterweights 31 so that the spacer strips are situated within the slots defined within respective depressors. Subsequently, as the horizontal beam 22 continues to descend from the position of FIG. 4A, the depressors 23' (FIG. 4B) urge the hooks 30 into position 30' shown in FIG. 4B. The supporting function of the hooks 30' thereby ceases and the spacer strips $R_0'$ fall onto the layer $P_1$ into position $R_1$ shown in FIG. 4C. At the same time the depressors 23" and their arms 50" conduct and guide the spacer strips $R_0'$ at both the top and sides thereof, while the strips fall under the action of gravity and therefore the depressors assure that in the final phase of their movement, that the spacer strips positively remain in their correct position. In this manner complete control of the spacer strip dropping is accomplished very simply, and there is no need for positively holding the spacer strips in engagement with the supporting hooks as by suction means or the like.

In the embodiment illustrated in FIG. 7, the supporting hooks 30b are provided with a spring 31b which normally hold the hooks in the strip supporting position. When the depressors 23 engage the spacer strips $R_0$, the hooks turn to position 30b' in phantom so that their support of the spacer strips $R_0'$ ceases whereupon the depressors 23 with their depressor arms fall into position 23" and 50". At the same time, the spacer strips which are being conducted and guided by the depressors fall onto the topmost layer $P_1$ of the timber package coming to rest at position $R_1$.

In FIG. 5 the distribution arms 28 are illustrated which, after the above-described steps are accomplished, fetch a new timber layer $P_0$ and locate the same over the spacer strips $R_1$, whereupon the above-described steps of the operation are repeated.

In the embodiments illustrated in FIGS. 1, 2, 5 and 6 which employ the fixed hooks 30a, it is expedient that the free movement of the depressors 23 and of their arms 50 is not fully utilized to the end, so that the frame structure 21, 22 does not press on the spacer strips. Instead, it is preferred that after the depressors have freely moved to an extent such that the depressors 23 lock the spacer strips in position, the conveyor 16 is run, whereby the strip $R_0'$ remains in the slot defined within the depressor 23' and falls together with the strip onto the layer $P_1$. In a similar manner, the conveyor 16 may run in reverse, in which case the hooks point in the direction opposite to that shown in FIG. 6.

It is possible according to the invention to use light spring members between the horizontal beams 22 and the depressors 23 or arms 50. In such an arrangement, as the supporting hooks are withdrawn from their supporting position whereupon the spacer strips $R_0$ begin to fall, the depressors 23 will start to fall, but with a slightly higher acceleration than the acceleration of gravity, downwardly upon the layer $P_1$. This ensures uninterrupted contact between the depressors and strips.

The connection between the depressors 23 and the frame structure 22 may also be carried out in ways other than by using the slide-fit of the pin-like arms 50 in beams 22 as seen in FIG. 3. Thus, the depressors 23 may be attached to the frame structure or the like, for example, by pivotally mounted articulated arms or the like.

It is apparent that variations and modifications of the invention can be made without departing from the spirit or scope thereof. Such variations and modifications are meant to be comprehended within the scope of the invention.

What is claimed is:

1. In a method whereby spacer strips are positioned between vertically adjacent layers of timer in timber packages including the steps of locating a plurality of spacer strips which are supported by distribution members over the topmost layer of a timber package, moving a plurality of depressor means operatively associated with a frame structure downwardly from an upper position so that respective depressor means engage respective spacer strips supported by said distributor members and conduct and guide the strips downwardly into position upon the topmost layer of the timber package while the distributor members which support the strips are at the same time withdrawn from their supporting positions, and then raising the depressor means back to the upper position whereupon the above steps are repeated, the improvement comprising:

arranging the depressor means in a manner such that as the depressor means move downwardly subsequent to engaging respective spacer strips, the frame structure with which the depressor means are associated remains substantially stationary and the downward motion of the depressor means comprises a free fall; and wherein during the downward movement of the depressor means, the spacer strips being conducted and guided thereby fall freely and are continuously and at all times guided at both the top and both sides thereof by the depressor means from the time the depressor means engage the spacer strips supported by said distributor members until the time the spacer strips engage the topmost layer of the timber package, whereby the spacer strips are accurately positioned upon the topmost timber package layer with any lateral movement of the spacer strips during downward movement or upon engagement with the topmost timber package layer due to bouncing being thereby eliminated.

2. The method of claim 1 wherein the downward motion of the depressor means comprises a free fall which is accelerated by a spring force.

3. The method of claim 1 wherein said downward movement of the spacer strips includes their falling downwardly under the force of gravity, said downward movement of the depressor means being under the action of gravity and comprising a free sliding movement of the depressor means in the frame structure.

4. The method of claim 1 wherein said downward movement of the depressor means is under the action of gravity and comprises a pivoting motion of the depressor means with respect to the frame structure.

5. The method of claim 1 wherein said locating step includes supporting the spacer strips on distributor members comprising pivotally mounted supporting hooks so that when the depressor means moves downwardly to engage the strips, a force is exerted thereon to pivot the hooks to withdraw the same from their supporting positions, the depressor means then moving downwardly following the spacer strips substantially under the action of gravity.

6. The method of claim 1 wherein said locating step includes supporting the spacer strips on distributor members comprising supporting hooks which are fixedly mounted to a distributor conveyor and retaining the spacer strips by the depressor means, the supporting hooks being withdrawn from the supporting position by running the distributor conveyor so that the spacer strips, being retained by the depressor means, are set free from the supporting hooks and thereafter said conducting and guiding step is performed by the depressor means substantially under the action of gravity.

7. In apparatus for positioning spacer strips between vertically adjacent layers of timber in timber packages including distribution conveyor means including a plurality of supporting hooks spaced from each other by a predetermined distance determined by the desired spacing between adjacent spacer strips for locating a plurality of spacer strips supported by said supporting hooks over the topmost layer of the timber package, a plurality of depressor means provided in a vertically movable frame structure at locations corresponding to the desired spacing of the spacer strips for conducting and guiding the spacer strips onto the topmost layer of the timber package, the improvement comprising:

said depressor means being operatively engaged with said frame structure so that said depressor means move downwardly to conduct and guide the spacer strips onto the topmost layer of the timber package, said downward motion of the depressor means comprising a free fall; and wherein the depressor means include depressors, each of which has top and side walls forming a slot adapted to receive a respective spacer strip in a manner such that during the downward movement of the depressor means, the spacer strips being conducted and guided thereby fall freely and are continuously and at all times guided at both the top and both sides thereof from the time the depressor means engage the spacer strips supported by said distributor members until the time the spacer strips engage the topmost layer of the timber package, whereby the spacer strips are accurately positioned upon the topmost timber package layer with any lateral movement of the spacer strips during downward movement or upon engagement with the topmost timber package layer due to bouncing being thereby eliminated.

8. The combination of claim 7 wherein said operative engagement between said depressor means and frame structure comprises a slide fit.

9. The combination of claim 8 wherein said frame structure comprises beams in which openings are formed and said depressor means include the depressors mounted at the lower end of respective arm members, and wherein said arm members are mounted in said openings with a free slide fit.

10. The combination of claim 7 wherein said operative engagement between said depressor means and frame structure comprises a pivotal engagement.